A. H. ORDWAY.
CRUPPERS FOR HARNESS.

No. 175,623. Patented April 4, 1876.

Witnesses:
Henry Chadbourn
F. Allen

Inventor:
Albert H. Ordway
by Alban Andren
his atty.

UNITED STATES PATENT OFFICE.

ALBERT H. ORDWAY, OF GROVELAND, MASSACHUSETTS.

IMPROVEMENT IN CRUPPERS FOR HARNESS.

Specification forming part of Letters Patent No. 175,623, dated April 4, 1876; application filed February 23, 1876.

*To all whom it may concern:*

Be it known that I, ALBERT H. ORDWAY, of Groveland, in the county of Essex and State of Massachusetts, have invented certain new and useful Improvements in Cruppers for Horses; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in horse-cruppers; and consists of a crupper open or divided in its rear end, and provided in its forward end with a hinge or flexible joint, by means of which this my improved crupper can be spread apart in its rear end, so as to be easily adjusted under the horse's tail without the need of putting the tail through the crupper, or without the need of unbuckling it, as is the case with the ordinary cruppers. The crupper is, as it were, automatically closed, when it is placed in proper position under the horse's tail, as soon as the hinge or flexible joint in its forward end comes in contact with the horse's back.

My improved crupper may be made of metal and covered with leather or suitable material, and provided in its forward end with suitable straps or buckles, one or both, for the purpose of attaching it to the back-strap, without departing from the spirit of my invention, which is a crupper divided or open in its rear end, and provided in its forward end with a hinge or flexible joint.

Figure 1:
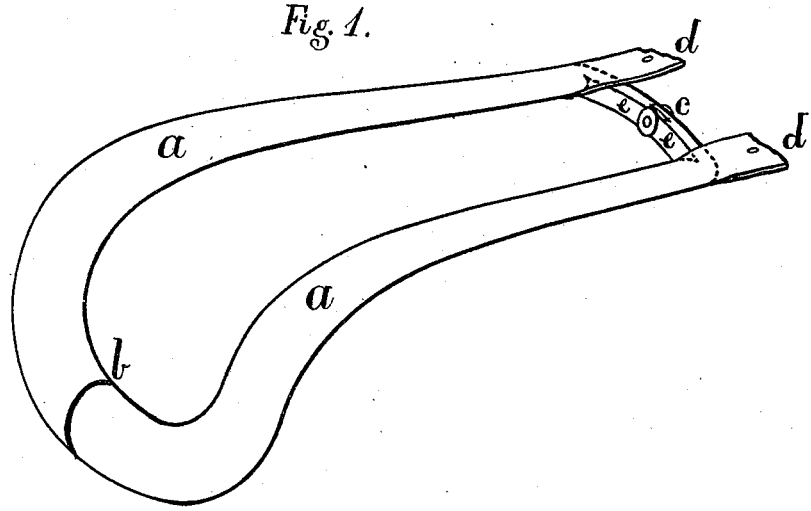
Figure 2:
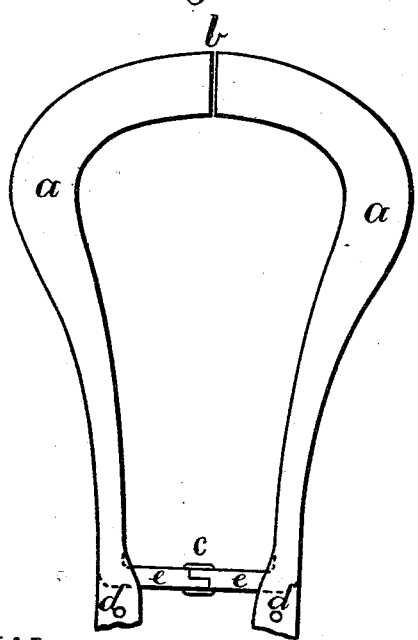

In the accompanying drawings, Figure 1 represents a perspective view of my invention. Fig. 2 represents a plan view of the same in a closed position, and Fig. 3 represents a plan view of the same in an open position.

Similar letters refer to similar parts wherever they occur on the different parts of the drawings.

The crupper is composed of the two rigid pieces $a$ $a$, that are open or disconnected from each other at the rear, $b$, as shown in Figs. 1 and 2. The parts $a$ $a$ are united together in their forward ends by means of hinge or flexible joint or connection $c$, by means of which the crupper is capable of being spread apart, in a manner as shown in Fig. 3, previous to putting it under the tail of the horse. The hinge or flexible connection $c$ may be provided with a snap or locking device, so as to confine the crupper more firmly in place after its being put in position. Straps $d$ $d$, with or without buckles, are secured either to the forward ends of the parts $a$ $a$ or to the cross-pieces $e$ $e$, in any desirable manner.

Figure 3:
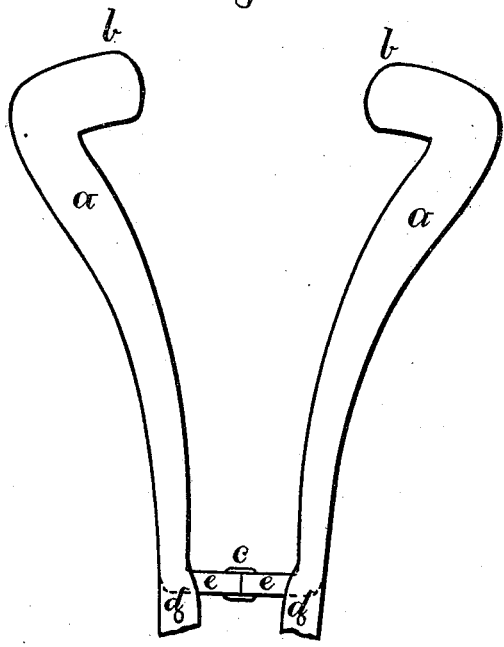

To secure my improved crupper in place under the tail of a horse, it is only necessary to spread it apart, as shown in Fig. 3, and to press it down under the tail, when the crupper will close of its own accord as soon as the hinge or flexible connection $c$ comes in contact with the upper part of the back of the horse. The strain of the back-strap connected to the forward part of the crupper tends to keep the parts $a$ $a$ closed together when the crupper is in use.

Having thus fully described the nature, construction, and operation of my invention, I wish to secure by Letters Patent, and claim—

The improved horse-crupper, as herein shown, consisting of the parts $a$ $a$, detached from each other at the rear, $b$, and provided at the forward end with a hinge, $c$, or flexible connection, substantially as and for the purpose set forth.

In testimony that I claim the foregoing as my own invention I have affixed my signature in presence of two witnesses.

ALBERT H. ORDWAY.

Witnesses:
ALBAN ANDRÉN,
F. ALLEN.